(12) United States Patent
Kuo et al.

(10) Patent No.: US 8,383,710 B2
(45) Date of Patent: Feb. 26, 2013

(54) WATERBORNE COATING COMPOSITIONS CONTAINING LOW-VOC COALESCENTS

(75) Inventors: Thauming Kuo, Kingsport, TN (US); Phillip Bryan Hall, Jonesborough, TN (US)

(73) Assignee: Eastman Chemical Company, Kingsport, TN (US)

( * ) Notice: Subject to any disclaimer, the term of this patent is extended or adjusted under 35 U.S.C. 154(b) by 212 days.

(21) Appl. No.: 12/909,198

(22) Filed: Oct. 21, 2010

(65) Prior Publication Data

US 2012/0101187 A1    Apr. 26, 2012

(51) Int. Cl.
*C08K 5/10*    (2006.01)

(52) U.S. Cl. ................................ 524/317; 523/335

(58) Field of Classification Search .................. 523/335; 524/317

See application file for complete search history.

(56) References Cited

U.S. PATENT DOCUMENTS

| | | | |
|---|---|---|---|
| 2,004,115 | A | 6/1935 | Izard et al. |
| 2,008,720 | A | 7/1935 | Lawson et al. |
| 4,634,730 | A | 1/1987 | Bogdany |
| 4,839,413 | A | 6/1989 | Kiehlbauch et al. |
| 4,927,876 | A | 5/1990 | Coogan et al. |
| 4,939,233 | A | 7/1990 | Jenkins et al. |
| 4,946,932 | A | 8/1990 | Jenkins |
| 5,137,961 | A | 8/1992 | Goos et al. |
| 5,247,040 | A | 9/1993 | Amick et al. |
| 5,296,530 | A | 3/1994 | Bors et al. |
| 5,484,849 | A | 1/1996 | Bors et al. |
| 7,524,896 | B2 | 4/2009 | Kim et al. |
| 2006/0201879 | A1 | 9/2006 | Boestert et al. |
| 2007/0015933 | A1 | 1/2007 | Kim et al. |
| 2008/0103340 | A1 | 5/2008 | Binder |
| 2008/0193725 | A1 | 8/2008 | De Saint-Romain |
| 2008/0242721 | A1 | 10/2008 | Selifonov |
| 2009/0118397 | A1 | 5/2009 | Bloom |
| 2010/0113664 | A1 | 5/2010 | Bradshaw et al. |
| 2010/0216915 | A1 | 8/2010 | Bloom |

FOREIGN PATENT DOCUMENTS

| | | |
|---|---|---|
| EP | 0 492 847 A2 | 7/1992 |
| EP | 0 501 614 A2 | 9/1992 |
| WO | WO 2007/094922 A2 | 8/2007 |
| WO | WO 2009/097142 A1 | 8/2009 |

OTHER PUBLICATIONS

Co-pending U.S. Appl. No. 12/909,179, filed Oct. 21, 2010; Thauming Kuo et al.

ASTM International, Designation: D 2354-10; "Standard Test Method for Minimum Film Formation Temperature (MFFT) of Emulsion Vehicles"; Jul. 2010, Downloaded Sep. 22, 2010.

ASTM International, Designation: D2369-07; "Standard Test Method for Volatile Content of Coatings"; Aug. 2007.

ASTM International, Designation: D2369-10; "Standard Test Method for Volatile Content of Coatings"; Sep. 2010, Downloaded Sep. 28, 2010.

ASTM International, Designation: D3960-05; "Standard Practice for Determining Volatile Organic Compound (VOC) Content of Paints and Related Coatings"; Aug. 2005, Downloaded Sep. 22, 2010.

Smith, Oliver W., et al.; "New vinyl ester monomers for emulsion polymers"; Progress in Organic Coatings, vol. 22; pp. 19-25; 1993.

Office Action dated May 31, 2011 for U.S. Appl. No. 12/909,179.

Office Action dated Dec. 2, 2011 for U.S. Appl. No. 12/909,179.

Office Action dated Apr. 13, 2012 for U.S. Appl. No. 12/909,179.

Moszner, Norbert et al.; "Reaction behavior of monomeric β-ketoesters"; Polymer Bulletin, vol. 23; pp. 419-426; 1994.

USPTO Office Action dated Oct. 15, 2012 for U.S. Appl. No. 12/909,179.

Notification of Transmittal of the International Search Report and the Written Opinion of the International Searching Authority with a Mailing Date of Dec. 29, 2011, International Application No. PCT/US2011/056241.

Notification of Transmittal of the International Search Report and the Written Opinion of the International Searching Authority with a Mailing Date of Feb. 6, 2012, International Application No. PCT/US2011/056247.

*Primary Examiner* — Edward Cain

(74) *Attorney, Agent, or Firm* — Dennis V Carmen

(57) ABSTRACT

Waterborne coating compositions are disclosed that include a latex emulsion polymer, and, as a coalescent, a levulinic acid ester of a monohydric aliphatic alcohol having from 10 to 20 carbon atoms. The coating compositions of the invention have a reduced VOC content, and provide improved coalescing activity compared with esters of polyols such as glycerol.

6 Claims, No Drawings

WATERBORNE COATING COMPOSITIONS CONTAINING LOW-VOC COALESCENTS

FIELD OF THE INVENTION

This invention relates to waterborne coating compositions, and in particular, to coating compositions that include latex emulsion polymers and a low-VOC coalescent that may be made from bio-based materials.

BACKGROUND OF THE INVENTION

Successful waterborne acrylic (or latex emulsion) coating compositions must deliver performance comparable to traditional solvent-borne coatings, while meeting increasingly stringent VOC (volatile organic compounds) emission regulations. It is known in the coatings art that the formation of a latex film can be facilitated by incorporating a coalescing agent in the latex emulsion. These coalescing agents, or coalescents, facilitate the individual latex particles coming together to thereby form a continuous film at a given temperature by reducing the minimum film-forming temperature (MFFT) of the latex polymer. Thus, as used throughout, the coalescents of the invention reduce the minimum film-forming temperatures of the coating compositions in which they are used, as further described below.

Traditional coalescents are described as fugitive coalescents since they tend to escape from the coating film over time. As a result, in some jurisdictions, such coalescents are regulated as VOCs, or volatile organic compounds. A need therefore exists for a non-fugitive coalescent that is capable of meeting the VOC regulations imposed on the paint industry.

Additionally, in recent years, there has been increased interest in renewable, bio-based materials, also due to environmental concerns. It is therefore an object of the invention to provide coalescents that may be used in coating compositions that are low in VOC emissions, and that can be made from bio-based materials.

Levulinic acid, or 4-ketopentanoic acid, is a bio-based chemical that can be produced with low cost by a biorefinery process using low-grade cellulosic by-products from paper mills and other biomass sources. Alternatively, levulinic acid may be prepared, for example, by heating sucrose with concentrated hydrochloric acid, or by other conventional synthetic methods. It may also be prepared by acid-catalyzed hydrolysis of cellulose. The generally accepted reaction pathway is, in a first step, to break down the polymer chains of cellulose into low molecular weight fragments, and eventually to glucose, which further decomposes to 5-hydroxymethylfurfural (HMF). In a second step, HMF is converted to levulinic acid and formic acid.

Levulinic ester derivatives are known plasticizers for cellulosic materials in organic solvent-based systems. Thus, U.S. Pat. No. 2,004,115 discloses the preparation of levulinic esters of modified polyhydric alcohols and their use as plasticizers for cellulose derivatives. U.S. Pat. No. 2,008,720 discloses the preparation of levulinic esters of monohydric alcohols and their applications as plasticizers for cellulose derivatives.

WO 2007/094922 discloses ester derivatives of levulinic acid that are useful as plasticizers and/or coalescent solvents in polymer compositions. The ester derivatives disclosed are the reaction products of levulinic acid with a polyol, for example glycerol. The polyols referred to are polyhydric alcohols having two or more hydroxyl groups, for example a sugar alcohol such as sorbitol, mannitol, erythritol, lactitol, maltitol, xylitol, glycerol, and the like.

U.S. Pat. Appln. Publn. No. 2008/0242721 discloses the preparation of ketal compounds from glycerol and levulinic acid, and the use of such ketal compounds as plasticizers.

EP 0501614 discloses the use of esters of keto-carboxylic acids as coalescing aids in paints and coatings. The document discloses that the coalescing aid should be volatile enough to escape when the applied paint is allowed to dry but should evaporate more slowly than water, which is the liquid carrier for the latex. N-butyl esters of the keto-carboxylic acids, especially 4-oxo-valeric acid and 5-oxo-caproic acid, are said to be most preferred. In this disclosure, the chain length of the alcohols used in the composition is from 2 to 8 carbon atoms.

While those skilled in the art would expect esters formed from an alcohol with a carbon chain length longer than eight carbons to be too hydrophobic and too bulky to be useful as coalescents, the present inventors have surprisingly discovered that the levulinic acid esters of a monohydric alcohol having a carbon chain length of at least 10 carbon atoms are effective coalescents, providing latex coating compositions having a reduced VOC content compared with those taught in the art, and thus contrary to the teaching that coalescing aids should readily evaporate. The levulinic acid esters according to the invention also exhibit improved coalescing activity compared with esters of polyols such as glycerol, as further elaborated below.

SUMMARY OF THE INVENTION

In one aspect, the invention relates to a waterborne coating composition that includes: (a) a latex emulsion polymer; and (b) a levulinic acid ester of a monohydric aliphatic alcohol having at least 10 carbon atoms.

In another aspect, the invention relates to waterborne coating compositions that include a latex emulsion polymer; and a levulinic acid ester of a monohydric aliphatic alcohol having from 10 to 20 carbon atoms.

In other aspects, the levulinic acid ester is an ester of a monohydric aliphatic alcohol having from 10 to 18 carbon atoms, or from 10 to 16 carbon atoms, or from 12 to 16 carbon atoms.

In another aspect, the levulinic acid ester may comprise an ester of one or more of the following monohydric aliphatic alcohols: 1-dodecanol; 1-tetradecanol; 1-hexadecanol; 2-hexyl-1-decanol; 2-butyl-1-octanol; a mixture of lauryl, myristyl, and cetyl alcohols; 1-decanol; 3,7-dimethyl-1-octanol; geraniol; citronellol; isodecanol; isoundecanol; or isotridecanol. In yet another aspect, the levulinic acid ester may comprise an ester of one or more of the following monohydric aliphatic alcohols: 1-tetradecanol, 1-hexadecanol, 2-hexyl-1-decanol, lauryl alcohol, myristyl alcohol, or cetyl alcohol. In yet another aspect, the levulinic acid ester may comprise an ester of 1-tetradecanol or 2-hexyl-1-decanol, or a mixture thereof.

In one aspect, the levulinic acid ester of the waterborne coating compositions is present in an amount of about 1% to about 20% by weight, based on the solids of the latex polymer in (a), or from 1% to 15% by weight, based on the solids of the latex polymer in (a), or from 1% to 10% by weight, based on the solids of the latex polymer in (a), in each case based on the solids of the latex polymer.

Other aspects of the invention are as disclosed and claimed below.

DETAILED DESCRIPTION OF THE INVENTION

In one aspect, the invention relates to waterborne coating compositions comprising a coalescent that is a levulinic acid ester of a monohydric alcohol. More specifically, the invention relates to a coating composition comprising a levulinic acid ester of a monohydric alcohol having at least 10 carbon atoms, or from 10 to 20 carbon atoms, that is, alcohols having relatively long-chain hydrophobic groups. Such levulinic acid esters are found to be particularly effective in reducing minimum film forming temperatures of latex emulsion polymers and are capable of providing coating formulations with lowered VOC emissions.

In one embodiment of the present invention, there is provided a waterborne coating composition comprising (a) a latex emulsion polymer and (b) a levulinic acid ester of a monohydric alcohol of the invention as a coalescent.

Examples of the latex emulsion polymers, component (a), include aqueous vinyl polymers, which are the reaction products of one or more ethylenically unsaturated monomers. Examples of the ethylenically unsaturated monomers include, but are not limited to, styrene, methyl acrylate, methyl methacrylate, ethyl acrylate, ethyl methacrylate, butyl acrylate, butyl methacrylate, isobutyl acrylate, isobutyl methacrylate, ethylhexyl acrylate, 2-ethylhexyl methacrylate, 2-ethylhexyl acrylate, isoprene, octyl acrylate, octyl methacrylate, iso-octyl acrylate, iso-octyl methacrylate, acrylic acid, methacrylic acid, itaconic acid, crotonic acid, α-methyl styrene, vinyl naphthalene, vinyl toluene, chloromethyl styrene, hydroxyethyl(meth)acrylate, hydroxypropyl(meth)acrylate, acrylonitrile, glycidyl methacrylate, acetoacetoxy ethyl methacrylate, acetoacetoxy ethyl acrylate, vinyl chloride, vinylidene chloride, vinyl acetate, butyl acrylamide, ethyl acrylamide, and the like.

Latex emulsion polymers are well known in the art of coating compositions, and we do not intend the term to be especially limiting, although some latex emulsion polymers may be better suited as coating compositions, either inherently or in combination with the coalescents of the invention. Examples of commercial latex emulsion polymers useful according to the invention include Rhoplex SG-30, Rhoplex HG-74P, Rhoplex SG-10M, Rhoplex AC2508, Ucar 626, and Ucar 379G (all available from The Dow Chemical Company), Acronal 296D (BASF Corp.), Aquamac 705 and Aquamac 588 (Hexion Specialty Chemicals), and the like.

The coalescents of the invention, that is, component (b), are ester derivatives of levulinic acid, which may be prepared by reacting a monohydric alcohol having at least 10 carbon atoms with levulinic acid, a levulinic acid halide, or levulinic acid anhydride, and especially with levulinic acid. The monohydric alcohols useful according to the invention are organic compounds having a single hydroxyl group. Although any monohydric alcohol having at least 10 carbon atoms may be used according to the invention, the preferred monohydric alcohol is a compound having from 10 to 20 carbon atoms, or from 10 to 18 carbon atoms, or from 10 to 16 carbon atoms, or from 12 to 16 carbon atoms. The monohydric alcohols may be straight chain molecules, for example, straight-chain aliphatic alcohols having at least 10 carbon atoms. Suitable monohydric alcohols thus include the so-called fatty alcohols that may be biologically derived, that is, capric alcohol (1-decanol), lauryl alcohol (1-dodecanol), myristyl alcohol (1-tetradecanol), cetyl alcohol (1-octadecanol), and arachidyl alcohol (1-eicosanol).

Suitable unsaturated fatty alcohols include palmitoleyl alcohol (cis-9-hexadecen-1-ol), elaidyl alcohol (9E-octadecen-1-ol), oleyl alcohol (cis-9-octadecen-1-ol), linoleyl alcohol (9Z,12Z-octadecadien-1-ol), elaidolinoleyl alcohol (9E,12E-octadecadien-1-ol), linolenyl alcohol (9Z,12Z,15Z-octadecatrien-1-ol), and elaidolinolenyl alcohol (9E,12E,15-E-octadecatrien-1-ol). Suitable branched monohydric alcohols include 2-hexyl-1-decanol and isostearyl alcohol (16-methylheptadecan-1-ol). The hydrocarbon chain of the monohydric alcohol may thus be saturated or unsaturated, straight chain or branched. Alcohols available from natural sources may be preferred in those cases in which environmentally-friendly compositions are desired.

Examples of monohydric alcohols suitable for this invention thus include 1-dodecanol, 1-tetradecanol, 1-hexadecanol, 2-hexyl-1-decanol (e.g. Jarcol 1-16 available from Jarchem Industries Inc.), 2-butyl-1-octanol (e.g. Jarcol 1-12), CO-1214 (a mixture of lauryl (65%) and myristyl (21-28%) and cetyl (4-8%) alcohols available from P&G Chemicals), 1-decanol, 3,7-dimethyl-1-octanol, geraniol, citronellol, isodecanol, isoundecanol, isotridecanol, ethoxylated fatty alcohols such as AE-2 (2-mole ethoxylate of C12/C14 alcohols), AE-3 (3-mole ethoxylate of C12/C14 alcohols) available from P&G Chemicals, 9-hexadecen-1-ol, oleyl alcohol, linoleyl alcohol, mixtures thereof, and the like.

For example, levulinic acid esters according to the invention, based on monohydric alcohols having from 12 to 16 carbon atoms, are found to be effective in reducing MFFT, as well as providing specimen coatings having a weight percent volatile content of less than 15%, as measured according to the heating schedule specified by ASTM Method D2369. This test may be conducted generally by heating the sample in a forced air oven at 110° C. for 60 minutes. The weight loss after the test is deemed to result from a loss of volatiles originally present in the sample; the percent volatile present in the original sample may then be calculated. Although the cited test can be conducted on coating compositions containing other components such as latex polymers, the values cited herein were obtained from a sample of the coalescent itself. Thus, the weight percent volatile of a coalescent is used herein as a yardstick to measure the amount of VOC the coalescent would contribute to the VOC of a coating composition.

In another aspect, the invention provides waterborne coating compositions comprising (a) a latex emulsion polymer and (b) a levulinic acid ester of a monohydric alcohol as the coalescent, wherein the levulinic acid ester provides a volatile content, for example, of less than 15% by weight. Examples of such monohydric alcohols in (b) include 1-dodecanol, 1-tetradecanol, 1-hexadecanol, 2-hexyl-1-decanol (e.g. Jarcol I-16 available from Jarchem Industries Inc.), 2-butyl octanol (e.g. Jarcol I-12), CO-1214 (available from P&G Chemicals), mixtures thereof, and the like.

Further, the levulinic acid esters according to the invention based on monohydric alcohols having from 14 to 16 carbon atoms are found to be effective in reducing MFFT as well as having a volatile content less than 10% as determined by ASTM Method D2369. Thus, in another embodiment, the invention provides a waterborne coating composition comprising (a) a latex emulsion polymer and (b) a levulinic acid ester of a monohydric alcohol as the coalescent, wherein the levulinic acid ester provides a volatile content of less than 10% by weight as determined by ASTM Method D2369. Examples of such monohydric alcohols in (b) include 1-tetradecanol, 1-hexadecanol, 2-hexyl-1-decanol (e.g., Jarcol I-16 available from Jarchem Industries Inc.), mixtures thereof, and the like.

The efficiency of a coalescent can be determined by determining the amount of the coalescent required to reduce the MFFT of a latex polymer to 40° F. (4.4° C.), which is the lowest desirable application temperature of a paint. It is generally considered unacceptable if the amount of the coalescent present in a paint formulation exceeds 20% by weight based on the solids of the latex polymer. This is particularly important for a non-volatile coalescent since the coalescent will remain in the dried film and thus cause a detrimental effect on the coating properties such as, for example, hardness, scrub resistance, and block resistance. As shown in Example 5, the coalescents of the examples are capable of reducing the MFFT of Rhoplex SG-30 from 12.9° C. to <4.4° C. when an amount of 5 phr (or 5 part per hundred of resin solids) is used, while the MFFT of Rhoplex HG-74P is reduced from 30° C. to <4.4° C. when an amount of 10 phr of the coalescent is used.

Thus, in another embodiment, the invention provides a waterborne coating composition comprising from about 1 to about 20 percent by weight, based on the solids of the latex polymer in the composition, of a levulinic acid ester of a monohydric alcohol as the coalescent, as already described. In some instances, a preferred ratio of from 1 to 15 percent may be desired, or alternatively, from 1 to 10 percent.

The levulinic acid esters of the invention can be prepared by reacting levulinic acid, a levulinic acid halide, or levulinic acid anhydride, with a monohydric alcohol to effect the formation of the ester linkage. The reaction may be carried out in the presence of an acid or base catalyst, or in the presence of an enzyme catalyst, with or without an organic solvent. Examples of acid catalysts include sulfuric acid, hydrochloric acid, p-toluenesulfonic acid, butylstannoic acid, borontrifluoride etherate, and the like. Examples of base catalysts include potassium hydroxide, sodium hydroxide, triethylamine, and the like. Examples of enzyme catalysts include lipase M (Mucor javanicus), Candida cylindracea lipase, lipase D (Rhizopus delemar), Lipozyme (Mucor miehei) (Novo Nordisk A/S Corp.), and the like. The reaction can be carried out at room temperature or at an elevated temperature.

The levulinic acid esters of the invention may be blended with other coalescents for ease of handling, storage, and application. For example, a solid levulinic acid ester may be blended with a liquid coalescent such as Optifilm Enhancer 400 (available from Eastman Chemical Co.) at various ratios to yield a coalescent in liquid form.

The coating compositions of the invention may further comprise other components commonly used in paint formulations, such as, for example, pigments, filler, rheology modifiers, thickeners, wetting and dispersing agents, deformers, freeze-thaw additives, colorants, open-time additives, driers, catalysts, crosslinkers, biocides, light stabilizers, and the like.

It may be particularly advantageous to add driers to the coating formulations when the levulinic acid ester of the present invention is based on an unsaturated fatty alcohol such as oleyl alcohol, linoleyl alcohol, geraniol, or citronellol. The added driers are capable of promoting oxidative crosslinking of the unsaturated moieties and thus providing enhanced coating properties. Examples of commercial driers include Zirconium HEX-CEM, Cobalt TEN-CEM, Calcium CEM-ALL, Zirconium HYDRO-CEM, and Cobalt HYDRO-CURE II sold by OMG Americas of Westlake, Ohio.

In other aspects, the latex emulsion polymers useful according to the invention may be a homopolymer, or a copolymer of an ethylenically unsaturated monomer and one or more additional copolymerizable monomers.

The polymers according to the invention are addition polymers that may be formed via a free-radical addition polymerization. In such addition polymers, the propagating species may be a free radical, and the polymer is formed in a chain-growth fashion polymerization as understood in the art. As noted, these polymers are latex emulsion polymers in which a monomer solution may be emulsified in an aqueous solution, and under agitation reacted via a free-radical polymerization process as described herein, to form latex particles.

Thus, the water-based latexes useful according to the invention may generally be prepared by polymerizing acrylic (ethylenically unsaturated) monomers. Before conducting polymerization, these ethylenically unsaturated monomers are either pre-emulsified in water/surfactant mixture or used as such.

The polymerization process of making these 'acrylic' latexes may also require an initiator (oxidant), a reducing agent, or a catalyst. Suitable initiators include conventional initiators such as ammonium persulfate, sodium persulfate, hydrogen peroxide, t-butyl hydroperoxide, ammonium or alkali sulfate, di-benzoyl peroxide, lauryl peroxide, di-tertiarybutylperoxide, 2,2-azobisisobutyronitrile, benzoyl peroxide, and the like.

Suitable reducing agents are those which increase the rate of polymerization and include, for example, sodium bisulfite, sodium hydrosulfite, sodium formaldehyde sulfoxylate, ascorbic acid, isoascorbic acid, and mixtures thereof.

Suitable catalysts are those compounds which promote decomposition of the polymerization initiator under the polymerization reaction conditions thereby increasing the rate of polymerization. Suitable catalysts include transition metal compounds and driers. Examples of such catalysts include, but are not limited to, AQUACATÔ, ferrous sulfate heptahydrate, ferrous chloride, cupric sulfate, cupric chloride, cobalt acetate, cobaltous sulfate, and mixtures thereof.

A conventional surfactant or a combination of surfactants is used as a stabilizer, such as an anionic or non-ionic emulsifier, in the suspension or emulsion polymerization preparation of a latex emulsion polymer of the invention. Examples of preferred surfactants include, but are not limited to, alkali or ammonium alkylsulfate, alkylsulfonic acid, or fatty acid, oxyethylated alkyphenol, sulfosuccinates and derivatives, or any combination of anionic or non-ionic surfactants. A list of suitable surfactants is available in the treatise: McCutcheon's Emulsifiers & Detergents, North American Edition, MC Publishing Co., Glen Rock, N.J., 1997. Preferably, the surfactant will provide droplet/particle stability, but result in minimal aqueous phase nucleation (micellar or homogeneous).

The latex emulsion polymers of the invention are thus prepared from monomers characterized as being ethylenically unsaturated monomers that can participate in addition polymerization reactions. As used herein, ethylenically unsaturated monomers may also be described as vinyl monomers. The polymers made from such monomers are thus addition polymers, and may be formed as emulsion polymers, also known as latexes or latex emulsions.

The latex emulsion polymers useful according to the invention may have pendant moieties, meaning that the ethylenically unsaturated monomers used to prepare the latex polymers of the invention have been reacted into an addition polymer, and that a portion of the monomers remains as a pendant moiety. Alternatively, we may say that the polymers according to the invention have residues from the ethylenically unsaturated monomers of the invention, in which case we mean that the monomers have been reacted into an addition polymer via their ethylenic unsaturation, and that a portion of the monomers remains as a residue. Both these descriptions are well-known in the art of addition polymers, and the descriptions are not otherwise intended to be especially limiting.

In one aspect, the invention thus relates to the use of emulsion polymers which are also known as latexes, or as used herein, latex emulsions. In these latexes, the polymers formed may have a particle size ranging, for example, from about 80 to about 300 nm, or from 100 nm to 250 nm, or from 125 nm to 200 nm. The $T_g$ of such latexes may range, for example, from about 0° C. to about 80° C., or from 15° C. to 60° C., or from 20° C. to 40° C.

The latex emulsion polymers useful according to the invention may be prepared by an emulsion free-radical polymerization of ethylenically unsaturated monomers. These latex polymers may be homopolymers, or may be copolymers formed from more than one ethylenically unsaturated monomer.

Examples of ethylenically unsaturated monomers include, but are not limited to, acrylic and methacrylic acid esters such as methyl(meth)acrylate, ethyl(meth)acrylate, propyl(meth)acrylate, isopropyl(meth)acrylate, butyl(meth)acrylate, isobutyl(meth)acrylate, hexyl(meth)acrylate, isooctyl(meth)acrylate, isodecyl(meth)acrylate, lauryl(meth)acrylate, stearyl(meth)acrylate, phenoxyethyl(meth)acrylate, methoxyethyl(meth)acrylate, benzyl(meth)acrylate, ethoxyethyl(meth)acrylate, 2-ethylhexyl(meth)acrylate, cyclopentyl(meth)acrylate and isobutyl(meth)acrylate, as well as combinations of these monomers. A combination of these monomers may be used in order to achieve an appropriate Tg or other properties for the latex emulsion polymer.

Such acrylic and methacrylic acid esters having a C1-C20 alcohol moiety are commercially available or can be prepared by known esterification processes. The acrylic and methacrylic acid ester may contain additional functional groups, such as, hydroxyl, amine, halogen, ether, carboxylic acid, amide, nitrile, and alkyl group. Such esters include carbodiimide(meth)acrylate, methyl(meth)acrylate, ethyl(meth)acrylate, butyl(meth)acrylate, isobutyl(meth)acrylate, ethylhexyl(meth)acrylate, octyl(meth)acrylate, isobutyl(meth)acrylate, allyl(meth)acrylate, and glycidyl(meth)acrylate.

Additional suitable polymerizable ethylenically unsaturated monomers include styrenic monomers. Styrenic monomers include styrene, as well as substituted styrenes such as C1-C6 alkyl ring-substituted styrene, C1-C3 alkyl alpha-substituted styrene or a combination of ring and an alpha-alkyl substituted styrene. Such styrenic polymerizable monomers include styrene, p-methyl styrene, o-methyl styrene, p-butyl styrene, alpha-methyl styrene, and combinations thereof.

In addition, vinyl esters may be used as copolymerizable monoethylenically unsaturated monomers, including vinyl esters of vinyl alcohol such as the VEOVA series available from Shell Chemical Company as VEOVA 5, VEOVA 9, VEOVA 10, and VEOVA 11 products. See O. W. Smith, M. J. Collins, P. S. Martin, and D. R. Bassett, Prog. Org. Coatings 22, 19 (1993).

In general, the vinyl monomers may be polymerized by a conventional emulsion free-radical initiated polymerization technique. The polymerization can be initiated by a water-soluble or water-dispersible free-radical initiator, optionally in combination with a reducing agent, at an appropriate temperature, for example from 55 to 90° C. The polymerization of the monomers may be conducted batch wise, semi-batch, or in a continuous mode.

A conventional surfactant or a combination of surfactants may be used such as anionic or non-ionic emulsifier in the suspension or emulsion polymerization to prepare a polymer of the invention. Examples of such surfactants include, but are not limited to, alkali or ammonium alkylsulfate, alkylsulfonic acid, or fatty acid, oxyethylated alkylphenol, or any combination of anionic or non-ionic surfactant. A surfactant monomer may be used such as HITENOL HS-20 (which is a polyoxyethylene alkylphenyl ether ammonium sulfate available from DKS International, Inc., Japan). A list of surfactants is available in the treatise: McCutcheon's Emulsifiers & Detergents, North American Edition and International Edition, MC Publishing Co., Glen Rock, N.J. 1993. The amount of the surfactant used is usually between 0.1 to 6 wt %, based on the total weight of the monomers.

As polymerization initiators, any conventional free-radical initiator may be used such as hydrogen peroxide, t-butylhydroperoxide, ammonium or alkali sulfate, di-benzoyl peroxide, lauryl peroxide, di-tertiarybutylperoxide, 2,2'-azobisisobuteronitrile, benzoyl peroxide, and the like. The amount of the initiator is typically between 0.05 to 6.0 wt %, based on the total weight of the total monomers.

A free-radical initiator may be combined with a reducing agent to form a redox initiating system. Suitable reducing agents are those which increase the rate of polymerization and include, for example, sodium bisulfide, sodium hydrosulfide, sodium,ascorbic acid, isoascorbic acid and mixtures thereof. The redox initiating system can be used at similar levels as the free-radical initiators.

In addition, in combination with the initiators and reducing agents, polymerization catalysts may be used. Polymerization catalysts are those compounds which increase the rate of polymerization by promoting decomposition of the free radical initiator in combination with the reducing agent at the reaction conditions. Suitable catalysts include transition metal compounds such as, for example, ferrous sulfate heptahydrate, ferrous chloride, cupric sulfate, cupric chloride, cobalt acetate, cobaltous sulfate, and mixtures thereof.

In addition, a low level of a chain transfer agent may also be used to prepare a latex polymer useful in accordance with the invention. Suitable chain transfer agents include, but are not limited to, butyl mercaptan, n-octylmercaptan, n-dodecyl mercaptan, butyl or methyl mercaptopropionate, mercaptopropionic acid, 2-ethylhexyl-3-mercaptopropionate, n-butyl-3-mercaptopropionate, isodecylmercaptan, octadecylmercaptan, mercaptoacetic acid, haloalkyl compounds, (such as carbon tetrabromide and bromodichloromethane), and the reactive chain transfer agents described in U.S. Pat. No. 5,247,040, incorporated herein by reference. In particular, mercaptopropionate, allyl mercaptopropionate, allyl mercaptoacetate, crotyl mercaptopropionate and crotyl mercaptoacetate, and mixtures thereof, represent preferred chain transfer agents.

A copolymerizable monomer known to promote wet adhesion may also be incorporated into the polymer. Examples of wet adhesion promoting monomers include, but are not limited to, nitrogen-containing monomers such as t-butylaminoethyl methacrylate, dimethylaminoethyl methacrylate, diethylaminoethyl methacrylate, N,N-dimethylaminopropyl methacrylamide, 2-t-butylaminoethyl methacrylate, N,N-dimethylaminoethyl acrylate and N-(2-methacryloyloxyethyl) ethylene urea.

Water-dispersible and water-soluble polymers may also be employed as surfactants or stabilizers in accordance with the present invention. Examples of such polymeric stabilizers include water-dispersible polyesters as described in U.S. Pat. Nos. 4,946,932 and 4,939,233; water-dispersible polyurethanes as described in U.S. Pat. Nos. 4,927,876 and 5,137,961; and alkali-soluble acrylic resins as described in U.S. Pat. No. 4,839,413, all of which are incorporated herein by reference. Cellulosics and polyvinyl alcohols may also be used. Surfactants and stabilizers may be used during the polymerization to control, for example, particle nucleation and growth, particle size and stability or they may be post-added to enhance stability of the latex or to modify other properties of the latex such as surface tension, wettability, and the like.

In one embodiment, at least one ethylenically unsaturated copolymerizable surfactant may be employed, for example those possessing isopropenyl phenyl or allyl groups. Copolymerizable surfactants may be anionic, such as containing a sulfate or sulfonate group, or nonionic surfactants. Other copolymerizable surfactants include those containing polyoxyethylene alkyl phenyl ether moieties. Additional copolymerizable surfactants include sodium alkyl allyl sulfosuccinate.

The latex polymers in accordance with the invention may have a weight average molecular weight (Mw), for example, of from 1,000 to 1,000,000, as determined by gel permeation chromatography (GPC), or from 5,000 to 250,000.

The particle size for the aqueous dispersions in accordance with the invention may be, for example, from about 0.01 to about 25 μm, or from 0.05 to 1 μm, or from 0.075 to 500 μm. Thus, in an emulsion polymerization in accordance with the invention, the particle size of the latex may range, for example, from 0.01 to 5 μm.

The latex particles generally have a spherical shape, and the spherical polymeric particles may have a core portion and a shell portion or a gradient structure. The core/shell polymer particles may also be prepared in a multi-lobe form, a peanut shell, an acorn form, a raspberry form, or any other form. If the particles have a core/shell structure, the core portion may comprise from about 20 to about 80 wt % of the total weight of the particle, and the shell portion may comprise about 80 to about 20 wt % of the total weight of the particle.

The glass transition temperature (Tg) of the latex polymers in accordance with the present invention, in the absence of the coalescents described herein, may be up to about 100° C. In a preferred embodiment of the present invention, where a film forming at ambient temperatures of the particles is desirable, the glass transition temperature of the polymer itself may preferably be under 60° C.

The latex polymers of the invention may comprise enamine functional polymers, with the enamine functionality serving to improve the hydrolytic stability of the acetoacetoxy group. Enamine functional polymers have been described in Polymer Bulletin 32,419-426 (1994). Additionally, enamine functional polymers are described in European Patent Application No. 0492847 A2; U.S. Pat. Nos. 5,296,530; and 5,484,849, all of which are incorporated herein by reference.

EXAMPLES

The following examples are given to illustrate the invention. It should be understood, however, that the invention is not to be limited to the specific conditions or details described in these examples.

Example 1

Synthesis of Levulinic Acid Ester of P&G CO-1214 (a Mixture of Lauryl and Myristyl Alcohols) (Levulinic Ester-1, or LE-1)

To a 300 mL, three-neck round-bottom flask equipped with a mechanical stirrer, a Dean-Stark adapter, a water condenser, and a nitrogen inlet were added levulinic acid (31.9 g, 0.275 mole), CO-1214 (49.0 g, 0.25 mole; available from P&G Chemicals), and concentrated sulfuric acid (0.025 g). The stirred mixture was gradually heated to 130° C. and the resulting condensate (water) collected in the Dean-Stark trap. The mixture was allowed to react further at 150° C. until 4 mL of water was collected (about 3.5 hours of reaction time in total). After being cooled to room temperature, the resulting mixture was taken in methylene chloride, extracted first with diluted KOH in water, and then neutralized with diluted HCl in water. The organic layer was separated, dried over anhydrous sodium sulfate, and filtered through glass wool. Solvent was subsequently removed under reduced pressure to yield a waxy solid product (58 g).

Example 2

Synthesis of Levulinic Acid Ester of 2-Hexyl-1-decanol (LE-2)

To a 300 mL, three-neck round-bottom flask equipped with a mechanical stirrer, a Dean-Stark adapter, a water condenser, and a nitrogen inlet were added levulinic acid (31.9 g, 0.275 mole), Jarcol 1-16 (2-hexyl-1-decanol) (60.5 g, 0.25 mole; available from Jarchem Industries Inc), and concentrated sulfuric acid (0.025 g). The stirred mixture was gradually heated to 130° C. and the resulting condensate (water) collected in the Dean-Stark trap. The mixture was allowed to react further at 150° C. until 4 mL of water was collected (about 3.5 hours of reaction time in total). After being cooled to room temperature, the resulting mixture was taken in methylene chloride, extracted first with diluted KOH in water, and then neutralized with diluted HCl in water. The organic layer was separated, dried over anhydrous sodium sulfate, and filtered through glass wool. Solvent was subsequently removed under reduced pressure to yield a liquid product (66.5 g).

Example 3

Synthesis of Levulinic Acid Ester of 1-Tetradecanol/2-Hexyldecanol (50/50 Ratio) (LE-3)

To a 300 mL, three-neck round-bottom flask equipped with a mechanical stirrer, a Dean-Stark adapter, a water condenser, and a nitrogen inlet were added levulinic acid (31.9 g, 0.275 mole), 1-tetradecanol (26.8 g, 0.125 mole), Jarcol I-16 (30.25 g, 0.125 mole; available from Jarchem Industries Inc), and concentrated sulfuric acid (0.025 g). The stirred mixture was gradually heated to 130° C. and the resulting condensate (water) collected in the Dean-Stark trap. The mixture was allowed to react further at 150° C. until 4.8 mL of water was collected (about 3 hours of reaction time in total). After being cooled to room temperature, the resulting mixture was taken in methylene chloride, extracted first with diluted KOH in water, and then neutralized with diluted HCl in water. The organic layer was separated, dried over anhydrous sodium sulfate, and filtered through glass wool. Solvent was subsequently removed under reduced pressure to yield a waxy solid product (54.5 g).

Example 4

Synthesis of Levulinic Acid Ester of 2-Ethyl-1-hexanol (LE-4) (Comparative)

To a 300 mL, three-neck round-bottom flask equipped with a mechanical stirrer, a Dean-Stark adapter, a water condenser, and a nitrogen inlet were added levulinic acid (58.0 g, 0.5 mole), 2-ethylhexanol (78.0 g, 0.6 mole), and concentrated sulfuric acid (0.05 g). The stirred mixture was gradually heated to 130° C. and the resulting condensate (water) collected in the Dean-Stark trap. The mixture was allowed to react at 130° C. until 8 mL of water was collected (about 2 hours of reaction time in total). A vacuum distillation apparatus was assembled after the mixture was cooled to 50° C. The mixture was then heated first to 100° C. and then to 120° C. to remove the excess 2-ethylhexanol under reduced pressure. The distillation was allowed to continue at 130 C, and a middle fraction of the product was collected for evaluation (17 g, liquid).

Example 5

Preparation of Latex Formulations and Determination of Their MFFTs

The levulinic acid esters synthesized in the examples above (LE-1, LE-2, LE-3, and LE-4) were formulated respectively with latexes Rhoplex SG-30 (an acrylic polymer emulsion) (50% solids; MFFT 12.9° C.) and Rhoplex HG-74P (a styrene-acrylic polymer emulsion) (42.5% solids; MFFT 30° C.) (both available from The Dow Chemical Company) at various ratios for MFFT determination.

Minimum film forming temperatures (MFFT) were determined using a MFFT bar (Rhopoint MFFT-60 available from Rhopoint Instruments Limited), which is designed to conform to ASTM D2354. The MFFT bar is equipped with sensors, heating elements, and circulating cooling water for controlling the temperature gradient. A program controlling the temperature range of 0° C. to 18° C. was selected for MFFT determination, and a 6-mil applicator was used to drawdown the samples. As used herein, ASTM D2354 refers to D2354-10, edition approved Jul. 1, 2010, originally approved in 1965, with a last previous edition approved in 1998 as D2354-98 which was withdrawn March 2007 and reinstated in July 2010.

After a constant-temperature gradient was established on the MFFT bar, samples were drawn down from the low- to the high-temperature of the bar by using a 6-mil, multi-sample draw-down bar; the resulting coating strips were covered and allowed to dry under nitrogen purge at temperatures ranging from 0° C. to 18° C. Approximately a period of two-three hours is required for the films to dry. MFFT was determined by observing the position along the temperature gradient of the draw-down surface where the dried films showed signs of cracking.

TABLE 1

Coating Compositions Containing Levulinic Acid Ester LE-1

| Formulation | Latex | Levulinic Acid Ester; LE-1 | LE-1 Ratio | MFFT |
|---|---|---|---|---|
| #1-1 | SG-30; 20.0 g | 0.5 g | 5 phr | 0.7° C. |
| #1-2 | SG-30; 20.0 g | 1.0 g | 10 phr | <0° C. |
| #1-3 | HG-74P; 23.5 g | 0.5 g | 5 phr | 9.2° C. |
| #1-4 | HG-74P; 23.5 g | 1.0 g | 10 phr | <0° C. |

TABLE 2

Coating Compositions Containing Levulinic Acid Ester LE-2

| Formulation | Latex | Levulinic Acid Ester; LE-2 | LE-2 Ratio | MFFT |
|---|---|---|---|---|
| #2-1 | SG-30; 20.0 g | 0.5 g | 5 phr | 4.1° C. |
| #2-2 | SG-30; 20.0 g | 1.0 g | 10 phr | 0° C. |
| #2-3 | HG-74P; 23.5 g | 0.5 g | 5 phr | 12.9° C. |
| #2-4 | HG-74P; 23.5 g | 1.0 g | 10 phr | <0° C. |

TABLE 3

Coating Compositions Containing Levulinic Acid Ester LE-3

| Formulation | Latex | Levulinic Acid Ester; LE-3 | LE-3 Ratio | MFFT |
|---|---|---|---|---|
| #3-1 | SG-30; 20.0 g | 0.5 g | 5 phr | 2.2° C. |
| #3-2 | SG-30; 20.0 g | 1.0 g | 10 phr | <0° C. |
| #3-3 | HG-74P; 23.5 g | 0.5 g | 5 phr | 9.2° C. |
| #3-4 | HG-74P; 23.5 g | 1.0 g | 10 phr | <0° C. |

TABLE 4

Coating Compositions Containing Levulinic Acid Ester LE-4

| Formulation | Latex | Levulinic Acid Ester; LE-4 | LE-4 Ratio | MFFT |
|---|---|---|---|---|
| #4-1 | SG-30; 20.0 g | 0.5 g | 5 phr | <0° C. |
| #4-2 | SG-30; 20.0 g | 1.0 g | 10 phr | <0° C. |
| #4-3 | HG-74P; 23.5 g | 0.5 g | 5 phr | <0° C. |
| #4-4 | HG-74P; 23.5 g | 1.0 g | 10 phr | <0° C. |

As can be seen from the data in Tables 1-4, Levulinic acid esters LE-1, LE-2, and LE-3 had coalescent effects at 10 phr comparable to that of LE-4, in which the monohydric alcohol used was 2-ethyl-1-hexanol, a branched alkyl having 8 carbon atoms. Additionally, as illustrated in Example 6, LE-1, LE-2, and LE-3 have volatile content ranging from 4.5% to 9.8%, whereas LE-4 has a volatile content of 100%.

As shown in Example 5, each coalescent of the invention in the example is capable of reducing the MFFT of Rhoplex SG-30 from 12.9° C. to <4.4° C. when an amount of 5 phr (or 5 part per hundred of resin solids) is used, while the MFFT of Rhoplex HG-74P is reduced from 30° C. to <4.4° C. when an amount of 10 phr of the coalescent is used.

Example 6

Determination of Volatile Content of Various Levulinic Acid Esters

The percentage of volatile organic compounds (VOCs) was determined in accordance with the heating schedule specified by ASTM Method D2369. A sample (about 0.5 g) of each levulinic acid ester was measured into a pre-weighed aluminum (68 mm in diameter by 15 mm high) pan and the precise weight of the sample recorded. Acetone (about 3 g) was then added to spread out the liquid sample or to dissolve the solid sample. A paper clip was used to stir the sample in the pan and was included in the weight calculation. The aluminum pan with the paper clip was then placed in a forced air oven at 110° C. for 60 minutes. The portion of the sample that had been lost during this test was considered volatile content, and its weight ratio determined.

TABLE 5

Volatile Content of Various Levulinic Acid Esters

| Levulinic Acid Ester | LE-1 | LE-2 | LE-3 | LE-4 |
|---|---|---|---|---|
| Percent Volatile | 9.8% | 6.3% | 4.5% | 100% |

Example 7

Synthesis and Evaluation of Levulinic Acid Ester of Glycerol (Control-LE) (Comparative)

To a 300 mL, three-neck round-bottom flask equipped with a mechanical stirrer, a Dean-Stark adapter, a water condenser, and a nitrogen inlet were added levulinic acid (95.7 g, 0.825 mole), glycerol (23.0 g, 0.25 mole), and concentrated sulfuric acid (0.075 g). The stirred mixture was gradually heated to 130° C. and the resulting condensate (water) collected in the Dean-Stark trap. The mixture was allowed to react further at 150° C. until 12.5 mL of water was collected (about 6 hours of reaction time in total). After being cooled to room temperature, the resulting mixture was taken in methylene chloride, extracted first with diluted KOH in water, and then neutralized with diluted HCl in water. The organic layer was separated, dried over anhydrous sodium sulfate, and filtered through glass wool. Solvent was subsequently removed under reduced pressure to yield a dark brown liquid product (47 g). The volatile content was determined as above to be 0%. The product was formulated for MFFT determination as described previously; the results are collected in the table below. The data in Table 6. show that this levulinic acid ester could only reduce the MFFT of SG-30 slightly and was incapable of reducing the MFFT of HG-74P under the testing conditions.

TABLE 6

Coating Compositions Containing Levulinic Acid Ester (Control-LE)

| Formulation | Latex | Levulinic Acid Ester; Control-LE | Control-LE Ratio | MFFT |
|---|---|---|---|---|
| Control-1 | SG-30; 20.0 g | 0.5 g | 5 phr | 8.6° C. |
| Control-2 | SG-30; 20.0 g | 1.0 g | 10 phr | 4.7° C. |
| Control-3 | HG-74P; 23.5 g | 0.5 g | 5 phr | >18° C. |
| Control-4 | HG-74P; 23.5 g | 1.0 g | 10 phr | >18° C. |
| Latex without coalescent | SG-30 | none | 0 | 12.9° C. |
| Latex without coalescent | HG-74P | none | 0 | >18° C. |

We claim:

1. A waterborne coating composition comprising:
   (a) a latex emulsion polymer; and
   (b) a levulinic acid ester of a monohydric aliphatic alcohol selected from the group consisting of 1-dodecanol; 1-tetradecanol; 1-hexadecanol; 2-hexyl-1-decanol; 2-butyl-1-octanol; a mixture of lauryl, myristyl, and cetyl alcohols; 1-decanol; 3,7-dimethyl-1-octanol; geraniol; citronellol; isodecanol; isoundecanol; isotridecanol and mixtures thereof.

2. The waterborne coating composition of claim 1, wherein the levulinic acid ester comprises an ester of one or more of the following monohydric aliphatic alcohols: 1-tetradecanol, 1-hexadecanol, 2-hexyl-1-decanol, lauryl alcohol, myristyl alcohol, or cetyl alcohol.

3. The waterborne coating composition of claim 1, wherein the levulinic acid ester comprises an ester of 1-tetradecanol or 2-hexyl-1-decanol, or a mixture thereof.

4. The waterborne coating composition of claim 1, wherein the levulinic acid ester is present in an amount of about 1% to about 20% by weight, based on the solids of the latex polymer in (a).

5. The waterborne coating composition of claim 1, wherein the levulinic acid ester is present in an amount from 1% to 15% by weight, based on the solids of the latex polymer in (a).

6. The waterborne coating composition of claim 1, wherein the levulinic acid ester is present in an amount from 1% to 10% by weight, based on the solids of the latex polymer in (a).

* * * * *